F. Davis,
L. Davis, Inventor

Patented Dec. 16, 1924.

1,519,296

UNITED STATES PATENT OFFICE.

FREEMAN DAVIS AND LOYD DAVIS, OF CENTERVILLE, IOWA.

POULTRY BEHEADER.

Application filed May 19, 1924. Serial No. 714,395.

*To all whom it may concern:*

Be it known that we, Drs. FREEMAN DAVIS and LOYD DAVIS, citizens of the United States, residing at Centerville, in the county of Appanoose and State of Iowa, have invented a new and useful Poultry Beheader, of which the following is a specification.

This invention has reference to a device especially designed for be-heading fowls, the primary object of the invention being to provide a device of this character which may be conveniently operated and one which will be exceptionally effective in its operation.

Another object of the invention is to provide a supporting means for holding the head of the fowl and a reciprocating knife moving adjacent to the supporting means to be-head the fowl.

A still further object of the invention is to provide a device of this character wherein the operation of the knife may be controlled by one hand of the operator, leaving the other hand free to hold the fowl.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing.

Figure 1:
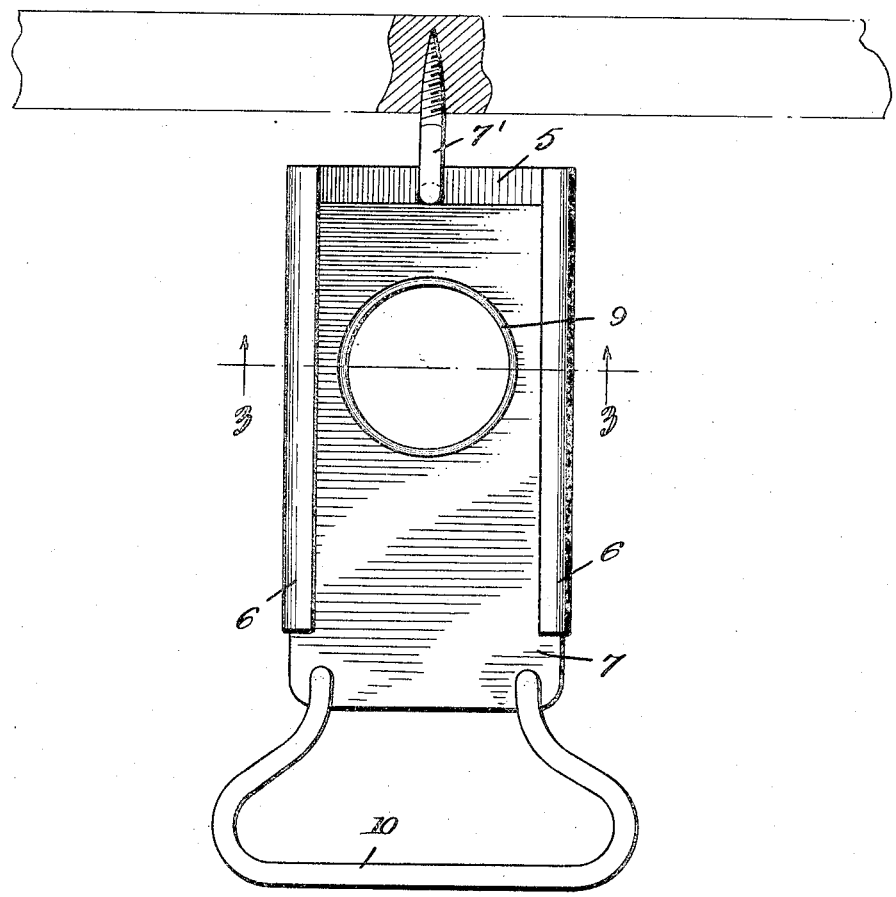
Figure 1 is a plan view disclosing a device constructed in accordance with the invention as supported for use.
Figure 2:
Figure 2 is an edge elevational view thereof.

Referring to the drawing in detail, the device includes a body portion 5 which is formed preferably of sheet metal and provided with inwardly extended flanges 6 that overlie the body portion to provide grooves for the blade 7.

The body 5 is formed with an opening to receive the eye bolt 7' whereby the body portion may be secured to a suitable supporting surface.

Figure 3:
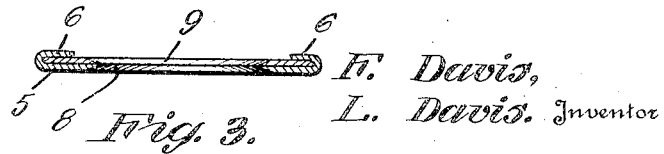
Figure 3 is a sectional view taken on line 3—3 of Figure 1.

The body portion is formed with an opening disposed intermediate its ends, the walls of which openings being beveled to provide a knife-like edge 8 as clearly shown by Figure 3 of the drawings. The knife-like edges of the body portion 5 cooperate with the knife-like edges 9 of the blade 7 so that when the head of a fowl is placed in the registering openings and the blade is operated, the moving of the blade 7 towards the operator, will result in the be-heading of the fowl.

In order that the blade may be conveniently operated, a handle 10 is provided, which handle has end portions extended through suitable openings in the blade 7 as clearly shown by Figure 1 of the drawing.

From the foregoing it will be obvious that due to this construction, a simple and efficient means is provided whereby the beheading of fowls may be accomplished.

We claim:—

1. In a device of the character described, a body portion having inwardly extended flanges providing guideways, said body portion having an opening, the wall of said opening being beveled to provide a knife-like edge, a blade adapted to move under the flanges, said blade having an opening, the walls thereof being beveled to provide a knife-like edge, said openings adapted to register to admit the head of a fowl, means for anchoring one end of the body portion, and a handle on the blade to permit the blade to be operated.

2. In a device of the character described, a body portion, guideways on the body portion, said body portion having an opening, a blade movable through the guideways and having an opening, said openings having beveled edges providing knife-like surfaces, said openings adapted to register to receive the head of a fowl, and a handle for operating the blade.

3. In a device of the character described, a body portion, said body portion having guiding flanges, a blade adapted to move over the body portion, said blade having its edges disposed under the flanges, said body portion and blade having openings, the edges of said openings being inclined to provide knife-like edges, and a handle on the blade for moving the blade over the body portion.

In testimony that we claim the foregoing as our own, we have hereto affixed our signatures.

LOYD DAVIS.
FREEMAN DAVIS.